United States Patent
Watabe

(10) Patent No.: US 7,924,442 B2
(45) Date of Patent: Apr. 12, 2011

(54) IMAGE FORMING SYSTEM AND IMAGE FORMING APPARATUS

(75) Inventor: Tatsuya Watabe, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 982 days.

(21) Appl. No.: 10/558,828

(22) PCT Filed: May 27, 2004

(86) PCT No.: PCT/JP2004/007266
§ 371 (c)(1),
(2), (4) Date: Nov. 29, 2005

(87) PCT Pub. No.: WO2004/107161
PCT Pub. Date: Dec. 9, 2004

(65) Prior Publication Data
US 2006/0244997 A1  Nov. 2, 2006

(30) Foreign Application Priority Data

May 30, 2003  (JP) .................................. 2003-155998

(51) Int. Cl.
*G06F 3/12* (2006.01)
(52) U.S. Cl. ...... 358/1.1; 358/1.15; 358/1.13; 358/1.14; 358/1.16; 726/26; 726/33; 726/2; 713/193; 713/189
(58) Field of Classification Search ................. 358/1.14, 358/1.15, 1.16
See application file for complete search history.

(56) References Cited

U.S. PATENT DOCUMENTS

| 5,633,932 | A  | * | 5/1997 | Davis et al. .................... 713/176 |
| 7,096,496 | B1 | * | 8/2006 | Challener et al. ................ 726/17 |
| 2001/0025343 | A1 | * | 9/2001 | Chrisop et al. ................. 713/193 |
| 2002/0036790 | A1 | * | 3/2002 | Nishiyama .................... 358/1.14 |
| 2002/0171867 | A1 | * | 11/2002 | Nobuhara et al. ............. 358/1.15 |
| 2004/0095595 | A1 | * | 5/2004 | Jacobsen ...................... 358/1.14 |

FOREIGN PATENT DOCUMENTS

| JP | 7-156467 | 6/1995 |
| JP | 9-223061 | 8/1997 |
| JP | 9-307772 | 11/1997 |
| JP | 2000-112694 | 4/2000 |
| JP | 2002-342061 | 11/2002 |
| JP | 2003-37719 | 2/2003 |
| JP | 2003-150360 | 5/2003 |

OTHER PUBLICATIONS

International Search Report of PCT/JP2004/007266, mailed Aug. 31, 2004.

* cited by examiner

*Primary Examiner* — Benny Q Tieu
*Assistant Examiner* — Paul F Payer
(74) *Attorney, Agent, or Firm* — Nixon & Vanderhye P.C.

(57) ABSTRACT

If it is not a time zone of confidential mode and there is a print job to be executed, a print process is performed based on the print job, but if there is not a print job to be executed, non-confidential data stored in a HDD device is completely deleted. In the time zone of confidential mode, a determination is made as to whether or not there is non-confidential data, and after deleting the non-confidential data, a print process based on a print job to be executed is performed. The confidentiality of data is maintained without decreasing the processing efficiency of image formation.

29 Claims, 15 Drawing Sheets

F I G. 1
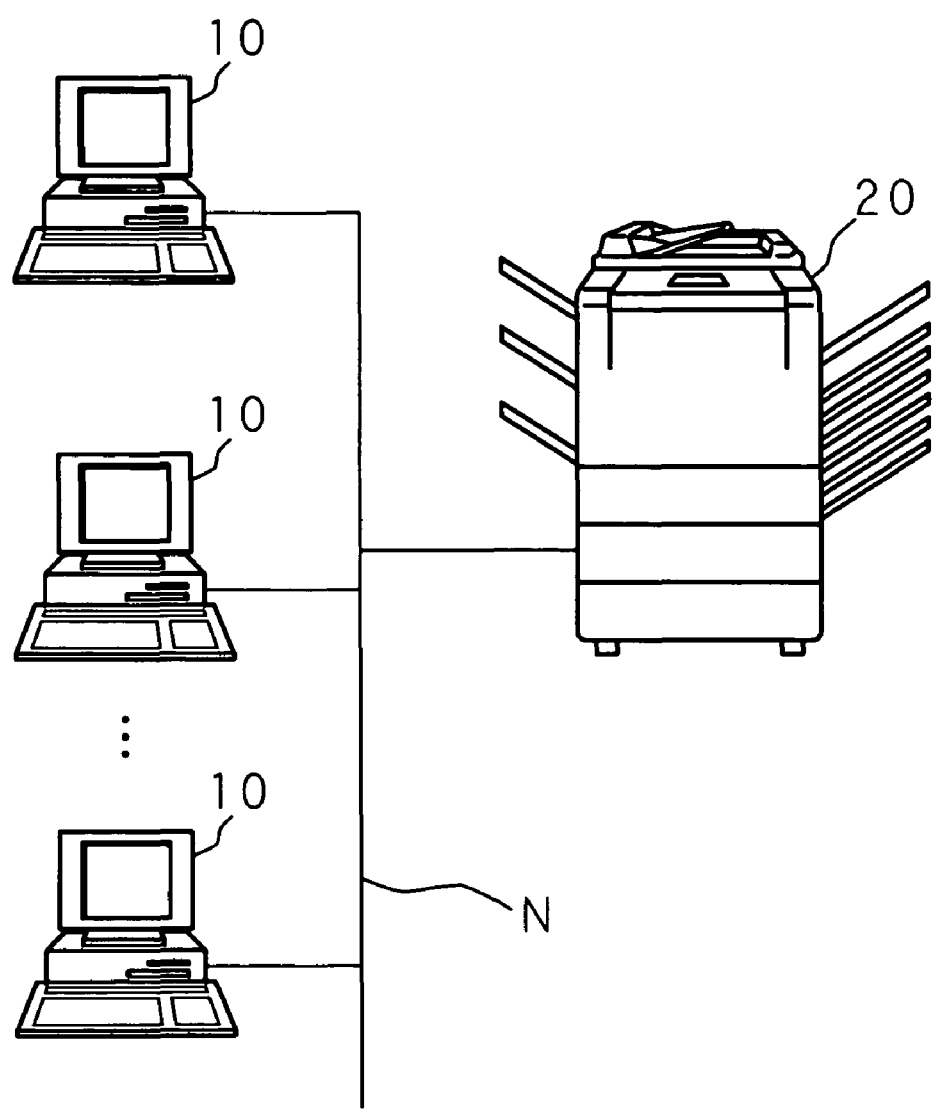

F I G. 2
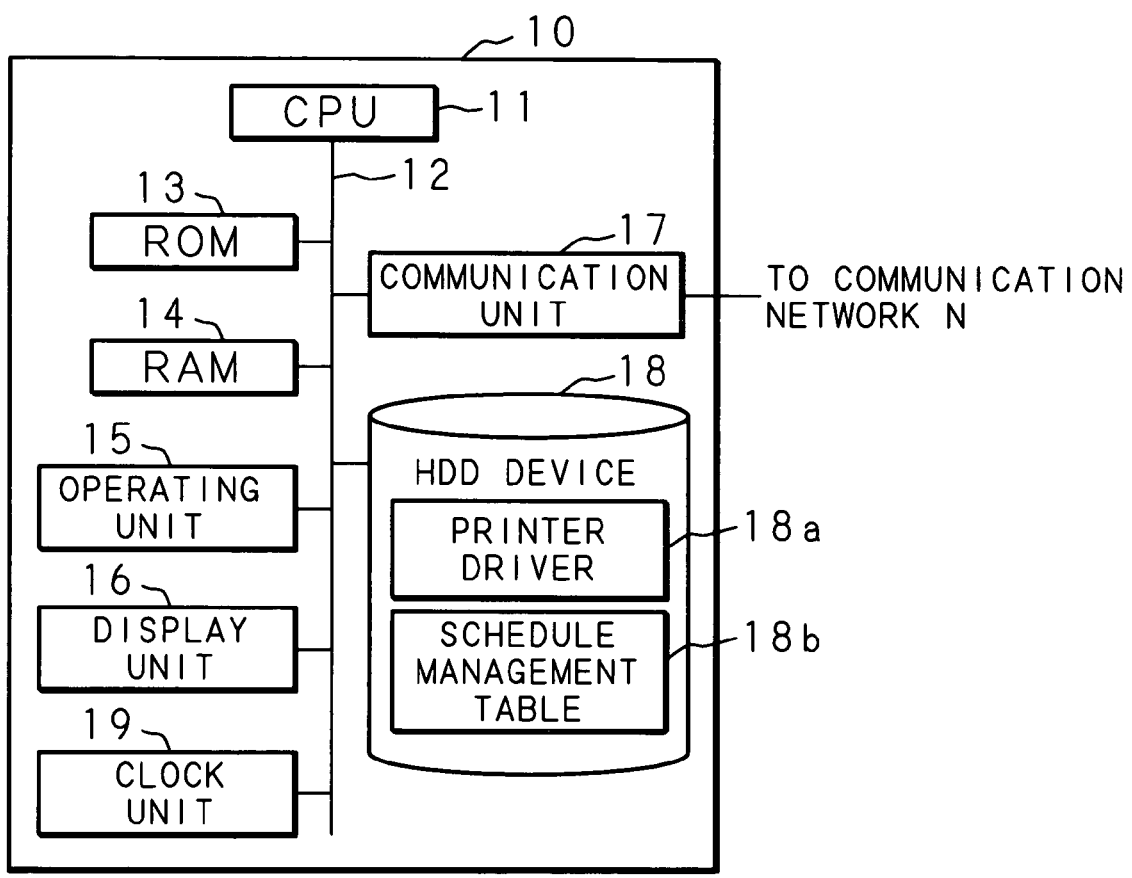

F I G. 4

|  | Mon. THROUGH Fri. | HOLIDAY |
|---|---|---|
| NORMAL MODE | 9:00−15:00 | — |
| CONFIDENTIAL MODE | 15:00−POWER OFF | ALL DAY |

31b (18b)

< NORMAL MODE >

< NORMAL MODE >

< CONFIDENTIAL MODE >

< CONFIDENTIAL MODE >

F I G. 1 2

|  | Mon. THROUGH Fri. | HOLIDAY |
|---|---|---|
| NORMAL MODE | 9:00-15:00 | — |
| CONFIDENTIAL MODE | 15:00-POWER OFF | ALL DAY |
| LIMIT TIME | 17:00 | — |

31b (18b)

F I G. 1 3
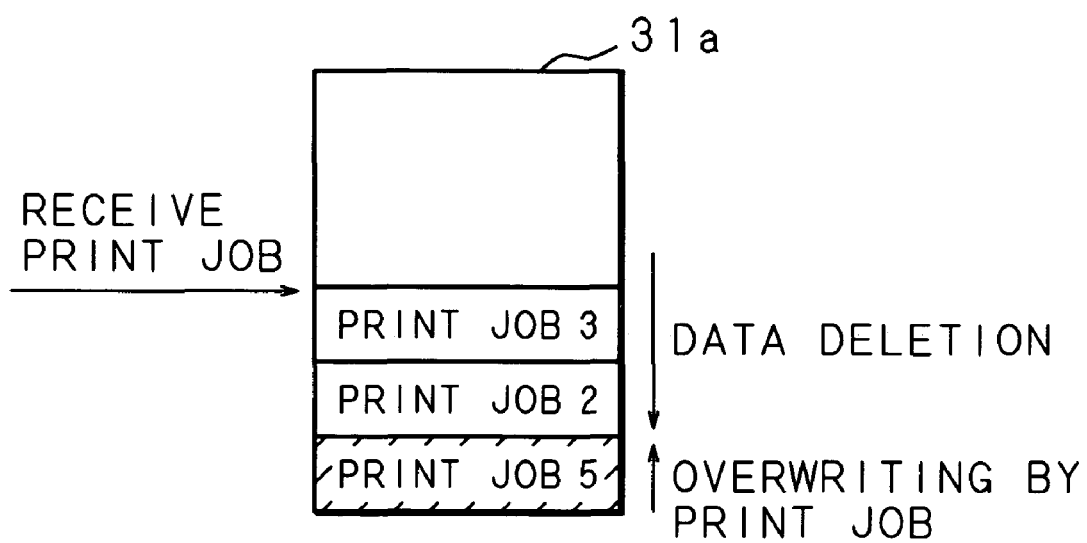

IMAGE FORMING SYSTEM AND IMAGE FORMING APPARATUS

This application is the US national phase of international application PCT/JP2004/007266, filed 27 May 2004, which designated the U.S. and claims priority of JP 2003-155998, filed 30 May 2003, the entire contents of each of which are hereby incorporated by reference.

TECHNICAL FIELD

The technical field of this disclosure relates to an image forming system and an image forming apparatus capable of maintaining the confidentiality of data without decreasing the processing efficiency.

BACKGROUND ART

A system of sharing an image forming apparatus by a plurality of information processors by connecting the information processors, such as personal computers, and the image forming apparatus, such as a printer and a multi-function machine, over a communication network has been proposed and introduced in offices, etc. This was realized by not only an increase in the speed of the image forming apparatus, but also a processing ability for receiving a plurality of jobs without a delay and forming images one after another, which is acquired by incorporating an internal storage device in the image forming apparatus.

Moreover, with an increase in the number of users on the communication network, a great importance is attached to the security of corporate data and personal data in outputting data according to an instruction from an information processor. Hence, a system was proposed to encrypt a print job to be transmitted between an information processor and an image forming apparatus over the communication network (see, for example, Japanese Patent Application Laid-Open No. 2002-342061). In addition, image forming apparatuses have started to include a so-called secure print function for temporarily delaying a print job received by an image forming apparatus and starting a print process upon authentication of a password from a user, etc.

Further, in recent years, image forming apparatuses include a storage device such as a HDD (Hard Disk Drive) device, thereby capable of temporarily storing print data to be processed. At this time, by making it difficult to read the print data by deleting the print data or overwriting random data upon completion of the print process, the confidentiality of print data is protected (see, for example, Japanese Patent Application Laid-Open No. 09-223061). Consequently, even if the internal storage device storing the print data is taken out by someone; it is possible to prevent the print data from being fraudulently taken out.

SUMMARY

Thus, if the confidentiality of print data handled by an image forming apparatus is high, it is necessary to encrypt a print job or delete the print data upon completion of the print process as described in the prior arts. However, when the print data is encrypted and transmitted by an information processor, it is also necessary to execute a coding process on an image forming apparatus side, and if the image forming apparatus is shared by a plurality of users, there is a problem that the print job processing efficiency decreases. Similarly, when deleting the print data stored in the HDD device in the image forming apparatus, since it takes a long time for deletion, there is a problem that the print job processing efficiency decreases.

In a non-limiting aspect of the invention, an image forming system and an image forming apparatus are provides, which are capable of enhancing the confidentiality of received data without decreasing the processing efficiency of image formation by, e.g., including storage means for storing data concerning image formation received from outside, and means for determining, based on time information outputted by clock means, whether or not it is a predetermined time zone, and performing a predetermined process on the data stored in the storage means if a determination is made that it is the predetermined time zone.

An illustrative non-limiting embodiment of an image forming system includes an information processor including means for receiving data concerning image formation and means for transmitting the received data; and an image forming apparatus including means for receiving data transmitted from the information processor, storage means for storing the received data, and means for forming an image on a sheet based on the stored data, and characterized in that the image forming apparatus comprises clock means for outputting time information; means for determining, based on the time information outputted by the clock means, whether or not it is a predetermined time zone; and means for performing a predetermined process on the data stored in the storage means if a determination is made that it is the predetermined time zone.

An illustrative non-limiting images forming apparatus comprises means for receiving data concerning image formation transmitted from the information processor and storage means for storing the received data. The image forming apparatus determines, based on the time information outputted by the clock means, whether or not it is a predetermined time zone, and performs a predetermined process on the data stored in the storage means if a determination is made that it is the predetermined time zone. Therefore, by performing a process of protecting confidentiality only in the predetermined time zone on the data stored in the storage means such as a HDD device, it is possible to enhance the confidentiality of data without decreasing the processing efficiency. For example, during working hours, since the possibility that the HDD device may be stolen and data may leak is low, the processing efficiency is increased by giving priority to the process of executing image formation based on the received data over the security process, and in a time zone near the closing time, the data stored in the HDD device is deleted so that, even when the HDD device is stolen in the absence of people after the closing time, it is possible to prevent leakage of data.

An illustrative non-limiting image forming system is characterized in that the predetermined process is a process of deleting the data after forming an image.

The data stored in the storage means can be deleted in a predetermined time zone. It is therefore possible to prevent leakage of data even when the storage means such as a HDD device is stolen, and since the deletion of data is performed only in a required time zone, the processing efficiency of image formation will not decrease.

An illustrative non-limiting information processor comprises means for encrypting data received in the above-mentioned predetermined time zone, and transmits the encrypted data to the image forming apparatus.

Data can be encrypted and then transmitted to the image forming apparatus in a predetermined time zone. It is therefore possible to prevent leakage of data even when the storage means such as a HDD device is stolen, and since the encryption of data is performed only in a required time zone, the processing efficiency of image formation will not decrease.

An illustrative non-limiting image forming apparatus includes means for receiving data concerning image formation, storage means for storing the received data, and means for forming an image on a sheet based on the data stored in the storage means, and characterized by comprising: clock means for outputting time information; determination means for determining, based on the time information outputted by the clock means, whether or not it is a predetermined time zone; and means for performing a predetermined process on the data stored in the storage means if a determination is made that it is the predetermined time zone.

An non-limiting illustrative embodiment comprises means for receiving data concerning image formation transmitted from outside and storage means for storing the received data, determines, based on the time information outputted by the clock means, whether or not it is a predetermined time zone, and performs a predetermined process on the data stored in the storage means if a determination is made that it is the predetermined time zone. Thus, by performing the process of protecting confidentiality only in a predetermined time zone on the data stored in the storage means such as a HDD device, it is possible to enhance the confidentiality of data without decreasing the processing efficiency. For example, during working hours, since the possibility that the HDD device may be stolen and data may leak is low, the processing efficiency is increased by giving priority to the process of executing image formation based on the received data over the security process, and in a time zone near the closing time, the data stored in the HDD device is deleted so that, even when the HDD device is stolen in the absence of people after the closing time, it is possible to prevent leakage of data.

An illustrative non-limiting image forming apparatus is characterized in that the predetermined process is a process of deleting the data after forming an image.

The data stored in the storage means can be deleted in a predetermined time zone. It is therefore possible to prevent leakage of data even when the storage means such as a HDD device is stolen, and since the deletion of data is performed only in a required time zone, the processing efficiency of image formation will not decrease.

An illustrative non-limiting image forming apparatus is characterized in that the data to be received includes information concerning whether or not the data itself is confidential, and the image forming apparatus further comprises: means for determining whether or not the received data is confidential; means for encrypting the data after forming an image based on the data if a determination is made that the data is confidential; and means for storing the encrypted data in the storage means.

If the received data is confidential, the data is encrypted and then stored. It is therefore possible to prevent leakage of data even when the storage means such as a HDD device is stolen.

An illustrative non-limiting image forming apparatus includes means for deleting a data area that has not been deleted in the storage means if the determination means determines that it is the above-mentioned predetermined time zone.

The data stored in the storage means is deleted in a predetermined time zone. It is therefore possible to prevent leakage of data even when the storage means such as a HDD device is stolen. Moreover, since a data area remaining without being deleted is deleted only in a required time zone, the processing efficiency of image formation will not decrease.

An illustrative non-limiting image forming apparatus includes means for determining whether or not there is data to form an image, wherein if there is no data to form an image, a data area that has not been deleted in the storage means is deleted.

If there is no data to form an image, a data area remaining in the storage means without being deleted is deleted, and therefore the confidentiality of data stored in the storage means can be secured without decreasing the processing efficiency of image formation.

An illustrative non-limiting image forming apparatus includes means for determining whether or not the time information outputted by the clock means is a predetermined time; and means for deleting a data area that has not been deleted in the storage means upon determining that it is the predetermined time.

A determination is made as to whether or not it is a predetermined time, and if it is the predetermined time, the data stored in the storage means at this time is deleted. Therefore, if it is necessary to turn off the power of the image forming apparatus at the closing time, for example, it is possible to enhance confidentiality by giving priority to deleting data, and it is possible to prevent leakage of data even if the HDD device is stolen after the closing time.

An illustrative non-limiting image forming apparatus is characterized in that when storing data in the storage means, the data is written over a data area that has not been deleted in the storage means.

When storing data, the data is written over an area that has not been deleted. Thus, since an increase of undeleted area can be prevented, it is possible to shorten the time taken for deleting data, and it is possible to prevent a decrease in the processing efficiency of the image forming system.

This illustrative non-limiting image forming apparatus comprises means for receiving data concerning image formation transmitted from outside and storage means for storing the received data, determines, based on the time information outputted by the clock means, whether or not it is a predetermined time zone, and performs a predetermined process on the data stored in the storage means if a determination is made that it is the above-mentioned predetermined time zone. Therefore, by performing a process of protecting confidentiality only in a predetermined time zone on the data stored in the storage means such as a HDD device, it is possible to enhance the confidentiality of data without decreasing the processing efficiency. For example, during working hours, since the possibility that the HDD device may be stolen and data may leak is low, it is possible to increase the processing efficiency by giving priority to the process of executing image formation based on the received data over the security process, and in a time zone near the closing time, the data stored in the HDD device is deleted so that, even when the HDD device is stolen in the absence of people after the closing time, it is possible to prevent leakage of data.

Accordingly, the data stored in the storage means is deleted in a predetermined time zone. It is therefore possible to prevent leakage of data even when the storage means such as a HDD device is stolen. Moreover, since the deletion of data is performed only in a required time zone, it is possible to execute image formation without decreasing the processing efficiency.

If the received data is confidential, the data is encrypted and then stored. It is therefore possible to prevent leakage of data even when the storage means such as a HDD device is stolen.

The data stored in the storage means is deleted in a predetermined time zone. It is therefore possible to prevent leakage of data even when the storage means such as a HDD device is stolen. Moreover, since a data area remaining without being deleted is deleted only in a required time zone, it is possible to perform image formation without decreasing the processing efficiency.

If there is no data to form an image, a data area remaining in the storage means without being deleted is deleted, and therefore the confidentiality of data stored in the storage means can be secured without decreasing the processing efficiency of image formation.

A determination is made as to whether or not it is a predetermined time, and if it is the predetermined time, the data stored in the storage means at this time is deleted. Therefore, if it is necessary to turn off the power of the image forming apparatus at the closing time, for example, it is possible to enhance confidentiality by giving priority to deleting data, and it is possible to prevent leakage of data even when the HDD device is stolen after the closing time.

When storing data, the data is written over an area that has not been deleted. Thus, since an increase of undeleted area can be prevented, it is possible to shorten the time taken for deleting data, and it is possible to prevent a decrease in the processing efficiency of the image forming system.

BRIEF DESCRIPTION OF THE DRAWINGS

FIG. 1 is a schematic structural diagram showing an entire structure of an illustrative non-limiting image forming system embodiment;

FIG. 2 is a block diagram for explaining an internal structure of an illustrative non-limiting embodiment of an information processor;

FIG. 4 is a conceptual view showing an illustrative non-limiting example of a schedule management table;

FIG. 12 is a conceptual view showing an illustrative non-limiting example of a schedule management table;

FIG. 13 is a schematic view for explaining an illustrative non-limiting process after a limit time.

DETAILED DESCRIPTION

Figure 3:
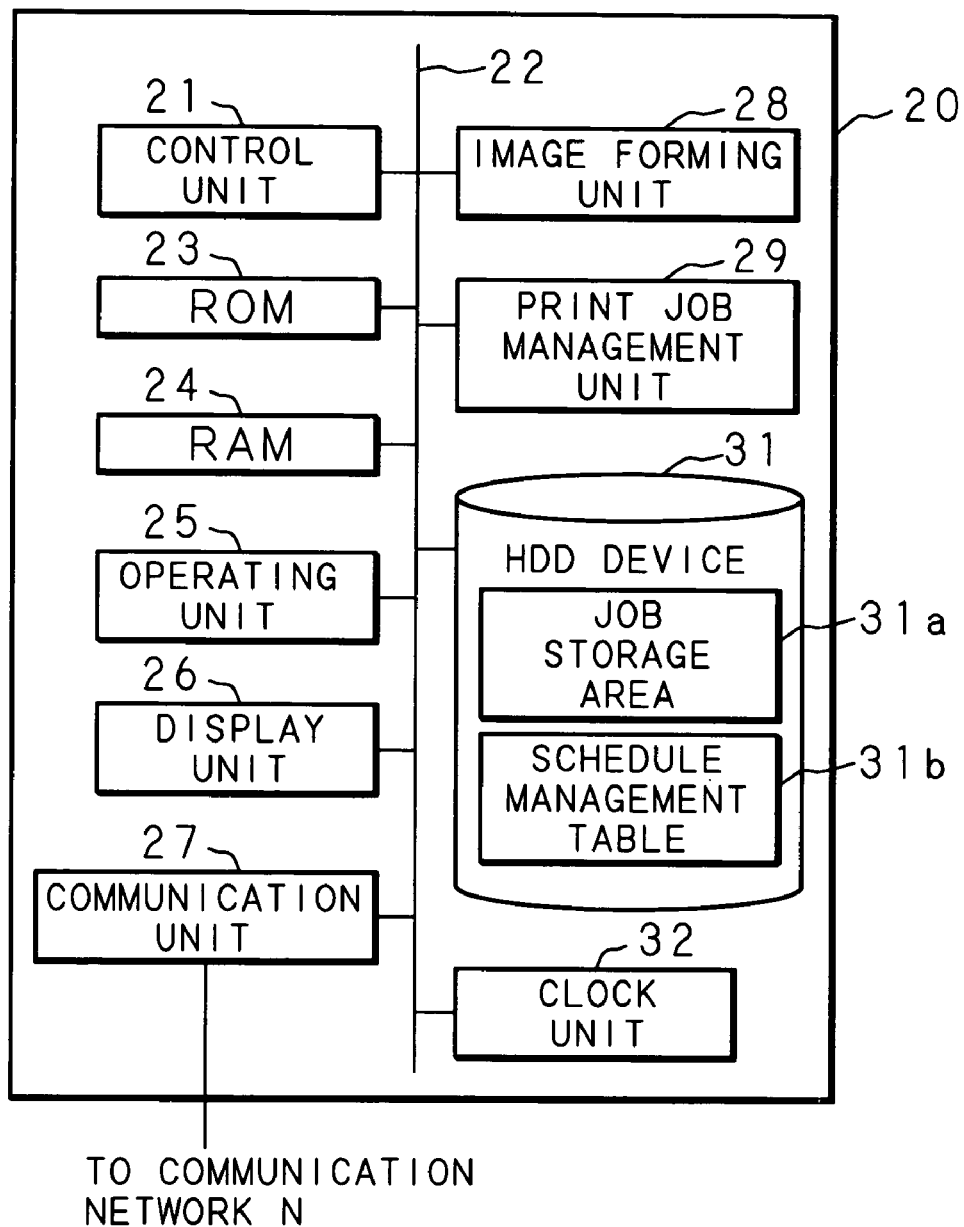
FIG. 3 is a block diagram for explaining an internal structure of an illustrative non-limiting embodiment of an image forming apparatus.

The following description will specifically explain one or more non-limiting embodiments of the present invention.

Embodiment 1

FIG. 1 is a schematic structural diagram showing an entire structure of an illustrative non-limiting embodiment of an image forming system. In FIG. 1, 10 represents an information processor such as a personal computer and a work station connected to an image forming apparatus 20 through a communication network N. The image forming apparatus 20 can be a printer, or a multi-function machine having a copy function, a scanner function, a facsimile function, etc. in addition to a print function, and receives a print job transmitted from the information processor 10 and executes a print process based on the print job.

In this embodiment, at least two modes are set for the confidentiality of data (print jobs) handled by the information processor 10 and the image forming apparatus 20. One is a normal mode that is set as a usual mode in which a security process is not executed on the image forming apparatus 20 side unless the user specifies the security process for a print job requested for the image forming apparatus 20. The normal mode is set, for example, in a time zone such as office hours in which many users are present and there is no possibility that the HDD device in the image forming apparatus 20 may be stolen, and the processing efficiency of the print job is increased by not executing the security process unless specified by the user. The other is a confidential mode that is set as a mode for deleting the data (print jobs) stored so far before the closing time because there is a possibility that the HDD device in the image forming apparatus 20 may be stolen after the closing time, for example. In this case, since the data is deleted even when the user does not specify the security process, it is possible to enhance the confidentiality of the data.

FIG. 2 is a block diagram for explaining internal structure of a non-limiting illustrative example of the information processor 10. The information processor 10 comprises a CPU 11, and the CPU 11 is connected through a bus 12 with hardware such as a ROM 13, a RAM 14, an operating unit 15, a display unit 16, a communication unit 17, a HDD device 18, and a clock unit 19. The CPU 11 controls the above-mentioned various kinds of hardware by reading and executing a control program pre-stored in the ROM 13. The RAM 14 is a volatile memory for temporarily storing various kinds of data generated during the execution of the control program, data inputted from outside through the operating unit 15, communication unit 17, etc, data read from the HDD device 18, and so on.

The operating unit 15 is composed of input devices such as a keyboard, a mouse and a tablet, and receives instructions from a user. The display unit 16 is composed of a display device such as a CRT display and a liquid crystal display, and displays data inputted through the operating unit 15 and various kinds of data generated according to instructions of the CPU 11. The communication unit 17 has a communication interface conforming to the communication network N, transmits a print job created therein to the image forming apparatus 20 through the communication network N, and receives various kinds of information transmitted from the image forming apparatus 20. The communication unit 17 controls such transmission and reception of information through the communication network N.

The HDD device 18 is a storage device including a disk-shaped magnetic recording medium, and stores a printer driver 18a and a schedule management table 18b in a part of the storage area. The printer driver 18a makes various settings to ensure connection to the information processor 10 and the image forming apparatus 20, creates a print job based on a user's instruction through the operating unit 15, and transmits the print job to the image forming apparatus 20 through the communication unit 17. The schedule management table 18b has information about time zones allocated to the normal mode and the confidential mode, respectively.

When the information processor 10 transmits a print job created therein to the image forming apparatus 20, it refers to the above-mentioned schedule management table 18b and the date information outputted by the clock unit 19, and determines whether it is the time zone of normal mode or the time zone of confidential mode. If a determination is made that it is the time zone of normal mode, the information processor 10 transmits the print job to the image forming apparatus 20 through the communication network N, and, if a determination is made that it is the time zone of confidential mode, the information processor 10 encrypts the print job to be transmitted and then transmits the encrypted print job to the image forming apparatus 20. Note that the encryption of the print job may be executed by a software process installed in the printer driver 18a, or may be executed by a hardware process by providing an encryption processing circuit in the communication unit 17.

FIG. 3 is a block diagram for explaining an internal structure of an illustrative non-limiting image forming apparatus 20. The image forming apparatus 20 comprises a-control unit 21 composed of a CPU, and the control unit 21 is connected through a bus 22 with hardware such as a ROM 23, a RAM 24, an operating unit 25, a display unit 26, a communication unit 27, an image forming unit 28, a print job management unit 29, a HDD device 31, and a clock unit 32. The ROM 23 stores a control program for controlling these hardware devices, and the control unit 21 controls the hardware by reading and executing the control program to function as the image forming apparatus 20. The RAM 24 is a volatile memory for temporarily storing various kinds of data generated during the execution of the control program, various kinds of data inputted through the operating unit 25 or the communication unit 27, image data obtained by developing a print job, etc.

The operating unit 25 comprises various kinds of operating keys (not shown) for receiving operating instructions from a user, and receives a switching operation of functions of the image forming apparatus 20 and settings, such as the number of prints and the density adjustment for image formation. The display unit 26 comprises a display device such as a CRT display or a liquid crystal display, and displays the operating state of the image forming apparatus 20 and various setting values inputted from the operating unit 25. Moreover, it may be possible to provide touch panel type software keys in a part of the display unit 26 to receive the above-mentioned various settings. The communication unit 27 has a communication interface conforming to the communication network N, and is capable of receiving data such as a print job from the information processor 10 and transmitting various kinds of data to the information processor 10 according to a need.

The image forming unit 28 comprises, for example, a charger for charging a photoconductive drum to a predetermined potential, a laser write device for creating an electrostatic latent image on the photoconductive drum by irradiating laser light according to image data received from outside, a developing device for visualizing the image by supplying toner to the electrostatic latent image formed on the photoconductive drum surface, and a transfer device (not shown) for transferring the toner image formed on the photoconductive drum surface onto a sheet, and thus it is possible to form an image desired by the user on a sheet by an electrophotographic method. Note that in this embodiment, it is constructed such that the image forming unit 28 executes an image forming process by an electrophotographic method by use of a laser write unit, but it may be constructed such that the image forming unit 28 executes an image forming process by an inkjet method, a heat-transfer method or a sublimation method.

The print job management unit 29 includes a non-volatile memory, and when the print job management unit 29 receives a print job from the information processor 10, it stores the job name of the print job, the name of the source device, and the information about the storage location of the print job in association with each other. The HDD device 31 is a storage device including a disk-shaped magnetic recording medium, and a part of its storage area is used as a job storage area 31a for storing a print job received through the communication unit 27, and a schedule management table 31b prescribing the time zones of normal mode and confidential mode.

FIG. 4 is a conceptual view showing a non-limiting illustrative example of the schedule management table 31b (18b). In this embodiment, at least two modes are set for the security process, and these modes are switched according to a time zone in which the image forming apparatus 20 is used. In the example shown in FIG. 4, 9:00 to 15:00 on weekdays (Monday through Friday) is set as the normal mode in which the received print job is processed prior to executing the security process. Besides, 15:00 until power off on weekdays, and holidays (Saturday, Sunday and public holidays) are set as the confidential mode in which the security process is executed prior to processing the received print job.

In other words, in the daytime of weekdays, since the possibility that the HDD device 31 may be taken out of the image forming apparatus 20 by someone and data may leak is low, priority is given to executing the received print job rather than decreasing the execution efficiency of the print job by performing the security process. On the other hand, in the nighttime, since there is a possibility that the HDD device 31 may be taken out and confidential information may leak, the print jobs stored in the job storage area 31a after finishing the processing as the print jobs are completely deleted upon switching to the confidential mode. Note that the schedule management table 18b in the information processor 10 is similar to the schedule management table 31b in the image forming apparatus 20, and when transmitting a print job in the time zone of confidential mode, the print job is encrypted and then transmitted to the image forming apparatus 20.

Figure 5:
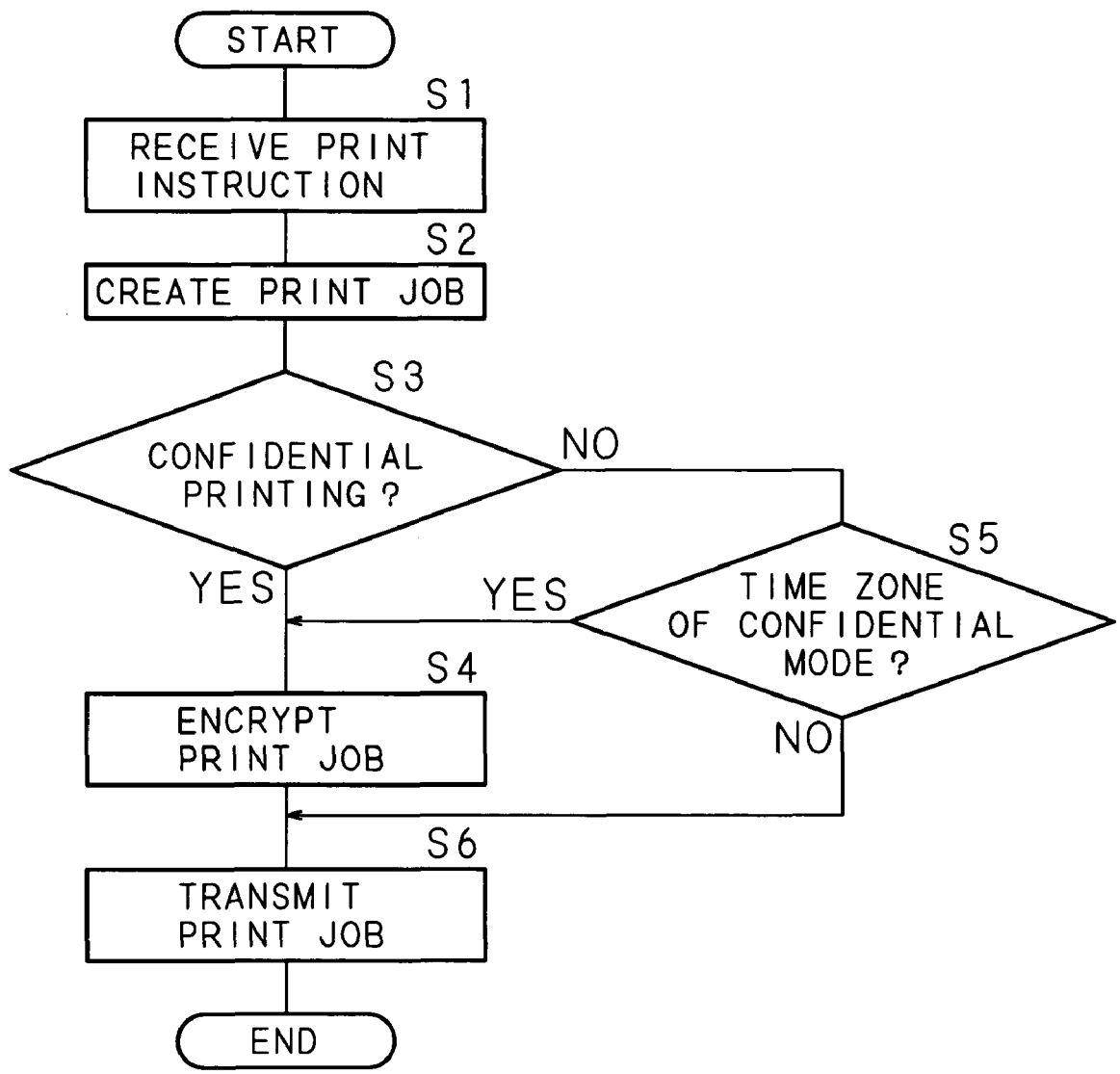
FIG. 5 is a flowchart for explaining an illustrative non-limiting procedure for transmitting a print job from the information processor.

FIG. 5 is a flowchart for explaining a non-limiting example procedure for transmitting a print job from the information processor 10. First, the information processor 10 activates the printer driver 18a according to an instruction from a user through the operating unit 15, and receives a print instruction (step S1). When the information processor 10 receives the print instruction, it creates a print job (step S2), and determines whether or not confidential printing is specified by the created print job (step S3). The determination as to whether or not confidential printing is specified is made by determining whether or not secure printing is specified by the printer driver 18a.

If a determination is made that confidential printing is specified (S3: YES), the information processor 10 encrypts the print job (step S4), and then transmits the encrypted print job through the communication unit 17 (step S6). On the other hand, if a determination is made that confidential printing is not specified (S3: NO), the information processor 10 refers to the schedule management table 18b and determines whether or not it is the time zone of confidential mode (step S5). If a determination is made that it is the time zone of confidential mode (S5: YES), the information processor 10 encrypts the print job and then transmits the encrypted print job. On the other hand, if a determination is made that it is not the time zone of confidential mode (S5: NO), the information processor 10 transmits the print job without encrypting the print job.

Figure 6A:
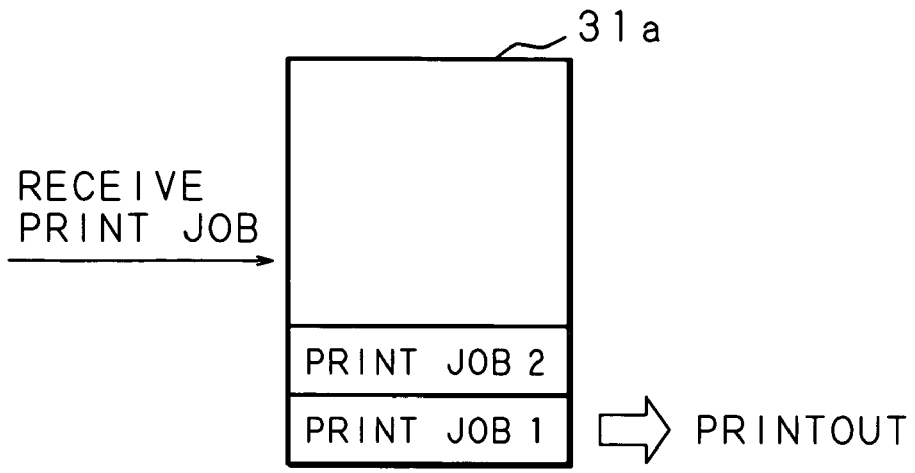
FIGS. 6A and 6B are schematic views for explaining a non-limiting illustrative example of a print job management method in a normal mode.
Figure 6B:
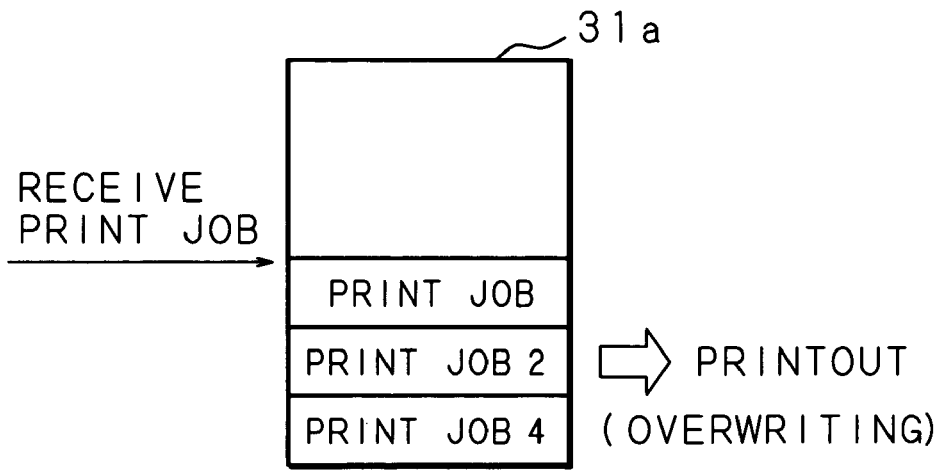

FIGS. 6A and 6B are schematic views for explaining an illustrative non-limiting example of a print job management method in the normal mode. When the image forming apparatus 20 receives a print job transmitted from the information processor 10, it stores the print job in the job storage area 31*a*, and registers the job name of the print job, the name of the source device and the information about the storage location of the print job in the print job management unit 29.

The example shown in FIG. 6A illustrates the state in which two print jobs, "print job 1" and "print job 2", are received, and the control unit 21 sequentially executes the print process from the print job ("print job 1") received first with reference to the print job management unit 29. Then, when the image forming apparatus 20 receives a new print job ("print job 3") before completing the processing of the "print job 1", it stores the new print job following the "print job 1" and "print job 2" in the job storage area 31*a*. Moreover, when the image forming apparatus 20 receives a new print job ("print job 4") after completing the processing of the "print job 1", it writes the "print job 4" over the storage area where the "print job 1" has been stored (FIG. 6B). In short, the FAT of the "print job 1" is deleted upon completion of the processing of the "print job 1".

Figure 7A:
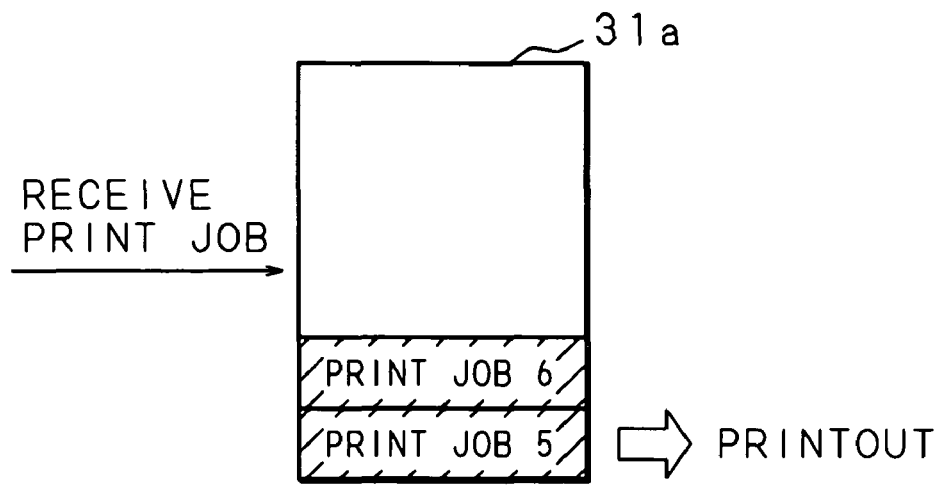
FIGS. 7A and 7B are schematic views for explaining a non-limiting illustrative example of a print job management method in a confidential mode.
Figure 7B:
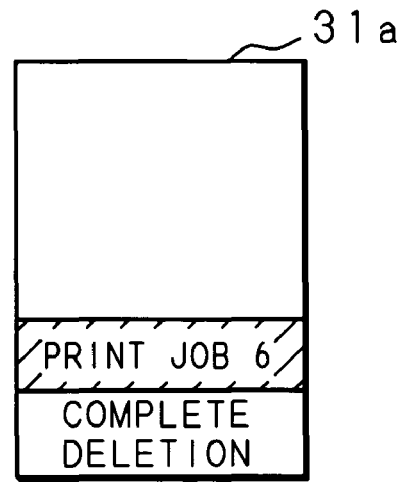

FIGS. 7A and 7B are schematic views for explaining an illustrative non-limiting example of a print job management method in the confidential mode. When the image forming apparatus 20 receives a print job transmitted from the information processor 10 in the time zone of confidential mode, it stores the received print job in the job storage area 31*a* after encrypting it, and registers the job name of the print job, the name of the source device and the information about the storage location of the print job in the print job management unit 29.

In the example shown in FIG. 7A, the image forming apparatus 20 receives a "print job 5" and a "print job 6" in the time zone of confidential mode, and stores the "print job 5" and "print job 6" in the job storage area 31*a* after encrypting them. In FIG. 7A, the encrypted print jobs are shown by cells with hatching. Then, after executing the processing of the "print job 5", the control unit 21 completely deletes the "print job 5" (FIG. 7B). Here, complete deletion of data means deleting not only the storage location of file (FAT), but also the data to make it difficult to reproduce the data itself, and, for example, compete deletion is executed by repeating overwriting of random data a predetermined number of times.

Figure 8:
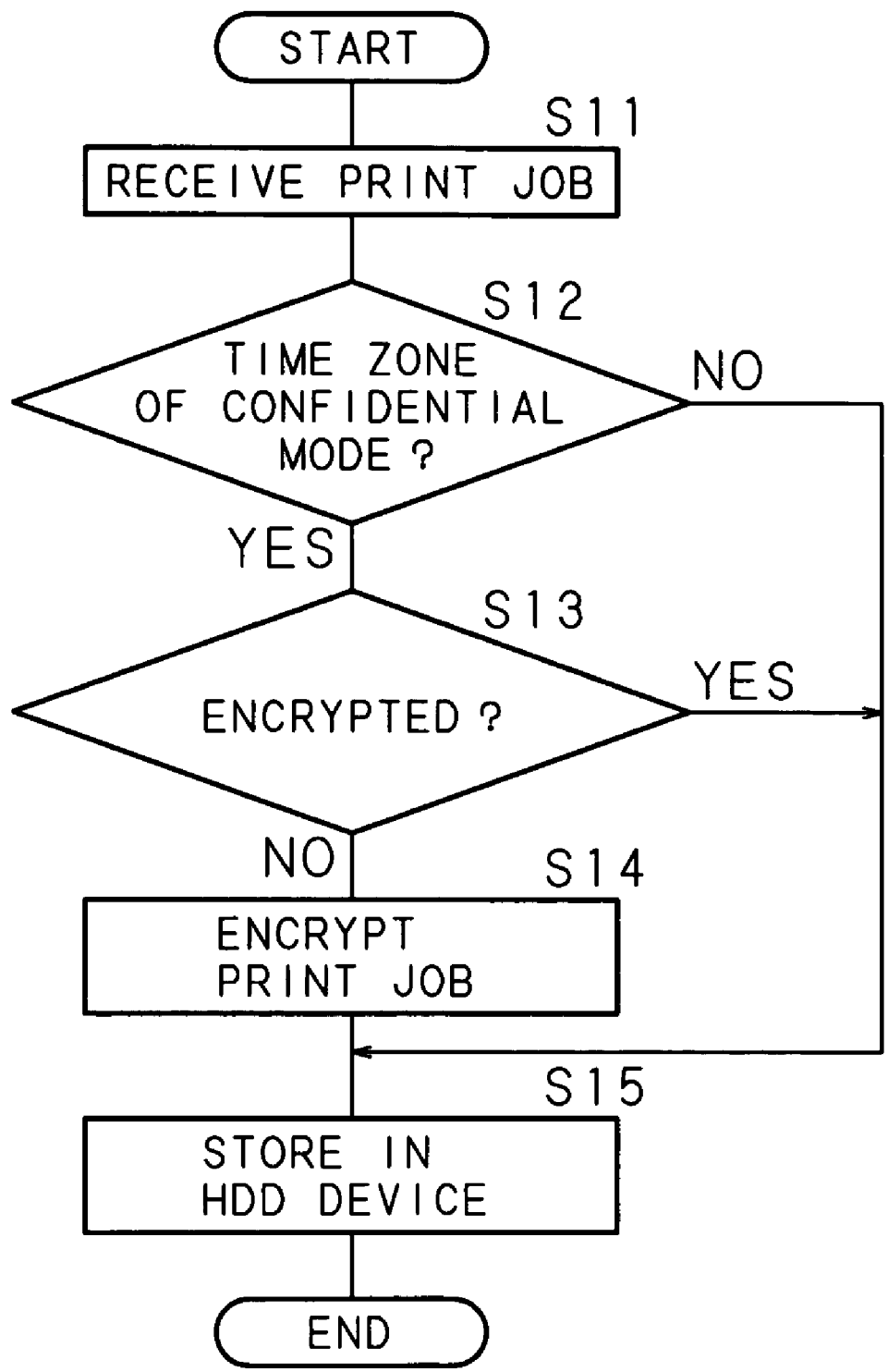
FIG. 8 is a flowchart for explaining an illustrative non-limiting example of a process to be executed when an image forming apparatus receives a print job.

FIG. 8 is a flowchart for explaining an illustrative non-limiting example of a process to be executed when the image forming apparatus 20 receives a print job. When the image forming apparatus 20 receives a print job through the communication unit 27 (step S11), the control unit 21 determines, based on the schedule management table 31*b* and the date information outputted by the clock unit 32, whether or not it is the time zone of confidential mode (step S12). If a determination is made that it is the time zone of confidential mode (S12: YES), the image forming apparatus 20 determines whether or not the received print job has been encrypted (step S13). If the received print job has not been encrypted (513: NO), the image forming apparatus 20 encrypts the print job (step S14), and then stores it in the job storage area 31*a* of the HDD device 31 (step S15). On the other hand, if a determination is made in step S12 that it is not the time zone of confidential mode (S12: NO), or if a determination is made in step S13 that the received print job has been encrypted (S13: YES), then the image forming apparatus 20 stores the received print job in the job storage area 31*a* of the HDD device 31 without executing the encryption process.

Figure 9:
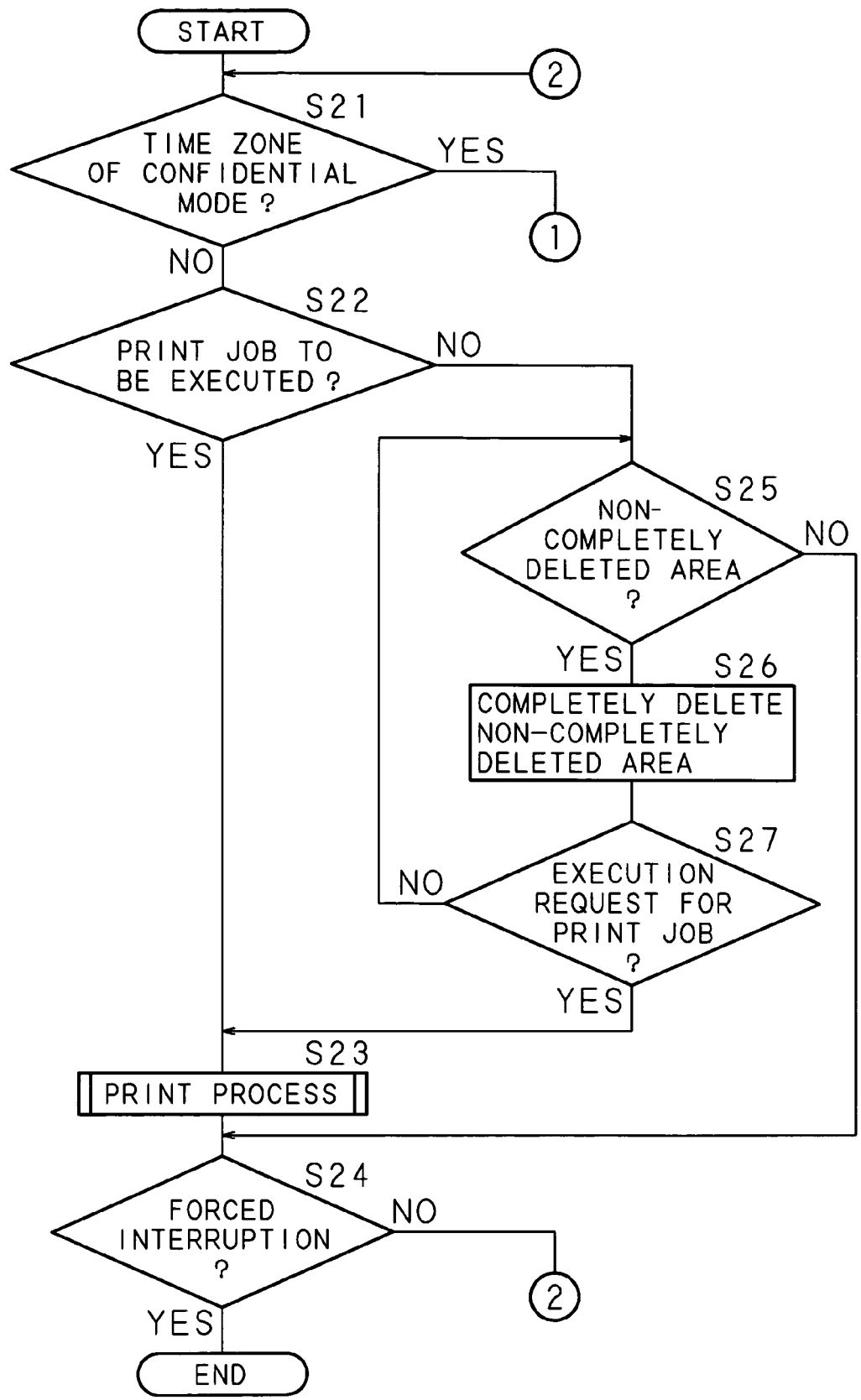
FIGS. 9 and 10 are a flowchart for explaining the illustrative non-limiting processing steps of executing a print process by an image forming apparatus.
Figure 10:
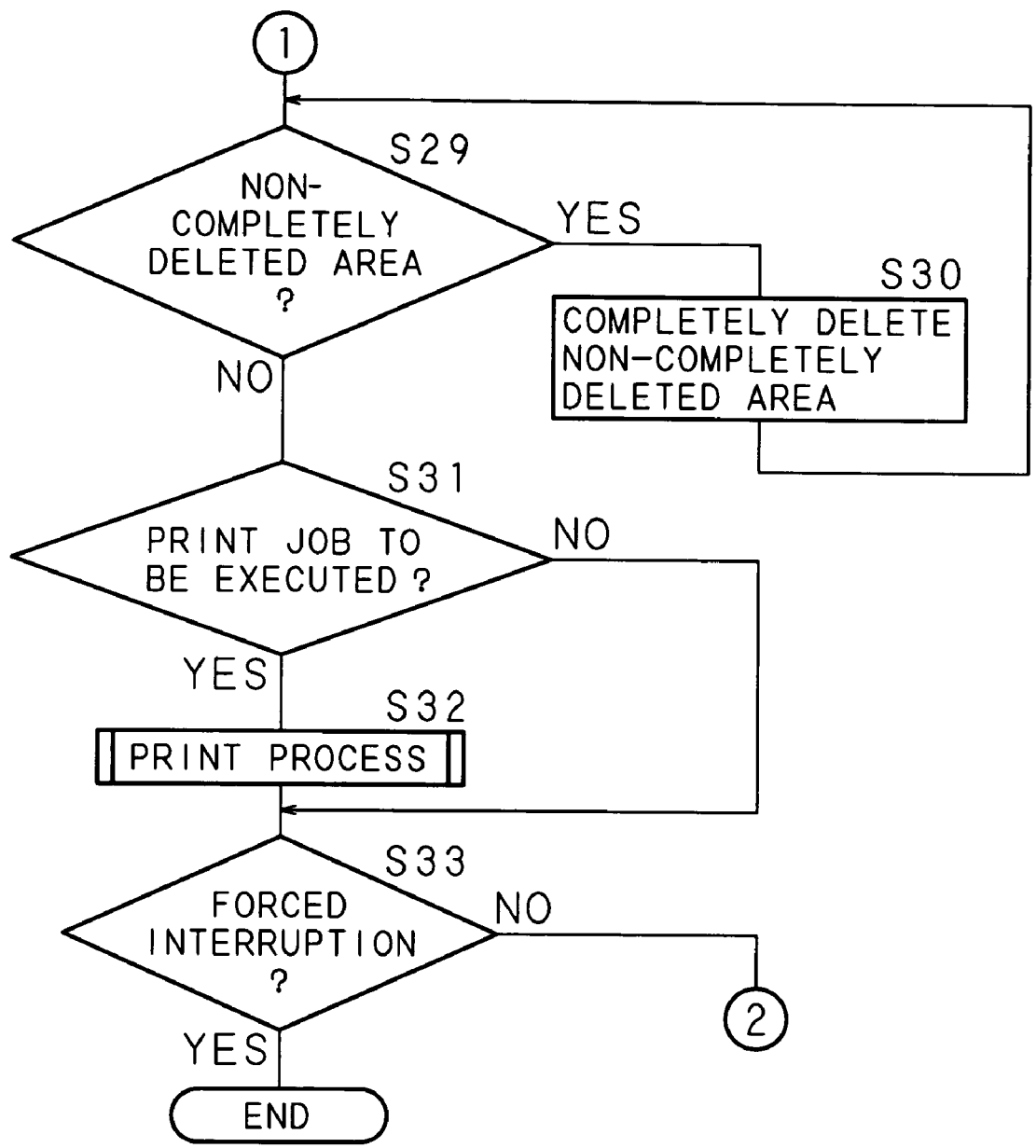

FIG. 9 and FIG. 10 show a flowchart for explaining illustrative non-limiting example processing steps of executing the print process by the image forming apparatus 20. First, the control unit 21 of the image forming apparatus 20 determines, based on the schedule management table 31*b* and the date information outputted by the clock unit 32, whether or not it is the time zone of confidential mode (step S21). If a determination is made that it is not the time zone of confidential mode (S21: NO), the control unit 21 refers to the print job management unit 29 and determines whether or not there is a print job to be executed (step S22). If there is a print job to be executed (S22: YES), the control unit 21 executes the print process based on the print job (step S23). Then, the control unit 21 determines whether or not there is a forced interruption caused by turning off the power of the image forming apparatus 20, resetting, etc. (step S24). If a determination is made that there is not a forced interruption (S24: NO), the control unit 21 returns the procedure to step S21. If a determination is made that there is a forced interruption (S24: YES), the control unit 21 finishes the procedure according to this flowchart.

In step S22, if a determination is made that there is no print job to be executed (S22: NO), the control unit 21 determines whether or not there is a non-completely deleted area stored in the job storage area 31*a* (step S25). Here, the non-completely deleted area means an area where only the FAT area was deleted after finishing the print process and the body of the print job remains. If a determination is made that there is a non-completely deleted area (S25: YES), the control unit 21 completely deletes the non-completely deleted area (step S26). Next, the control unit 21 determines whether or not there is an execution request for the print process by a newly received print job (step S27). If a determination is made that there is an execution request (S27: YES), the control unit 21 moves the procedure to step S23 and executes the print process. On the other hand, if a determination is made that there is not an execution request (S27: NO), the control unit 21 returns the procedure to step S25, and continues to completely delete the non-completely deleted area remaining in the job storage area 31*a* of the HDD device 31. In step S25, if a determination is made that there is not a non-completely deleted area (S25: NO), the control unit 21 moves the procedure to step S24. Thus, in the time zone of normal mode, when a print job to be executed is received, execution of the process of the print job is given top priority, and the non-completely deleted area stored in the job storage area 31*a* of the HDD device 31 is deleted while no print job is received.

In step S21, if a determination is made that it is the time zone of confidential mode (S21: YES), the control unit 21 determines whether or not there is a non-completely deleted area in the job storage area 31*a* of the HDD device 31 (step S29). If a determination is made that there is a non-completely deleted area (S29: YES), the control unit 21 completely deletes the non-completely deleted area stored in the job storage area 31*a* (step S30), and returns the procedure to step S29. Then, if a determination is made that there is not a non-completely deleted area stored in the job storage area 31*a* (S29: NO), the control unit 21 refers to the print job management unit 29 and determines whether or not there is a print job to be executed (step S31). If a determination is made that there is a print job to be executed (S31: YES), the control unit 21 executes the print process based on the print job (step S32). After finishing the print process, or if a determination is that there is not a print job to be executed (S31: NO), the control unit 21 determines whether or not there is a forced interruption caused by turning off the power of the image forming apparatus 20, resetting, etc. (step S33). If a determination is made that there is not a forced interruption (S33: NO), the control unit 21 returns the procedure to step S21, and, if a determination is made that there is a forced interruption (S33: YES), the control unit 21 finishes the procedure according to this flowchart.

Thus, in the time zone of confidential mode, complete deletion of non-completely deleted areas stored in the job storage area 31a is started upon switching from the normal mode to the confidential mode, and after all the non-completely deleted areas have been completely deleted, a print job registered in the print job management unit 29, or a newly received print job, is executed.

Figure 11:
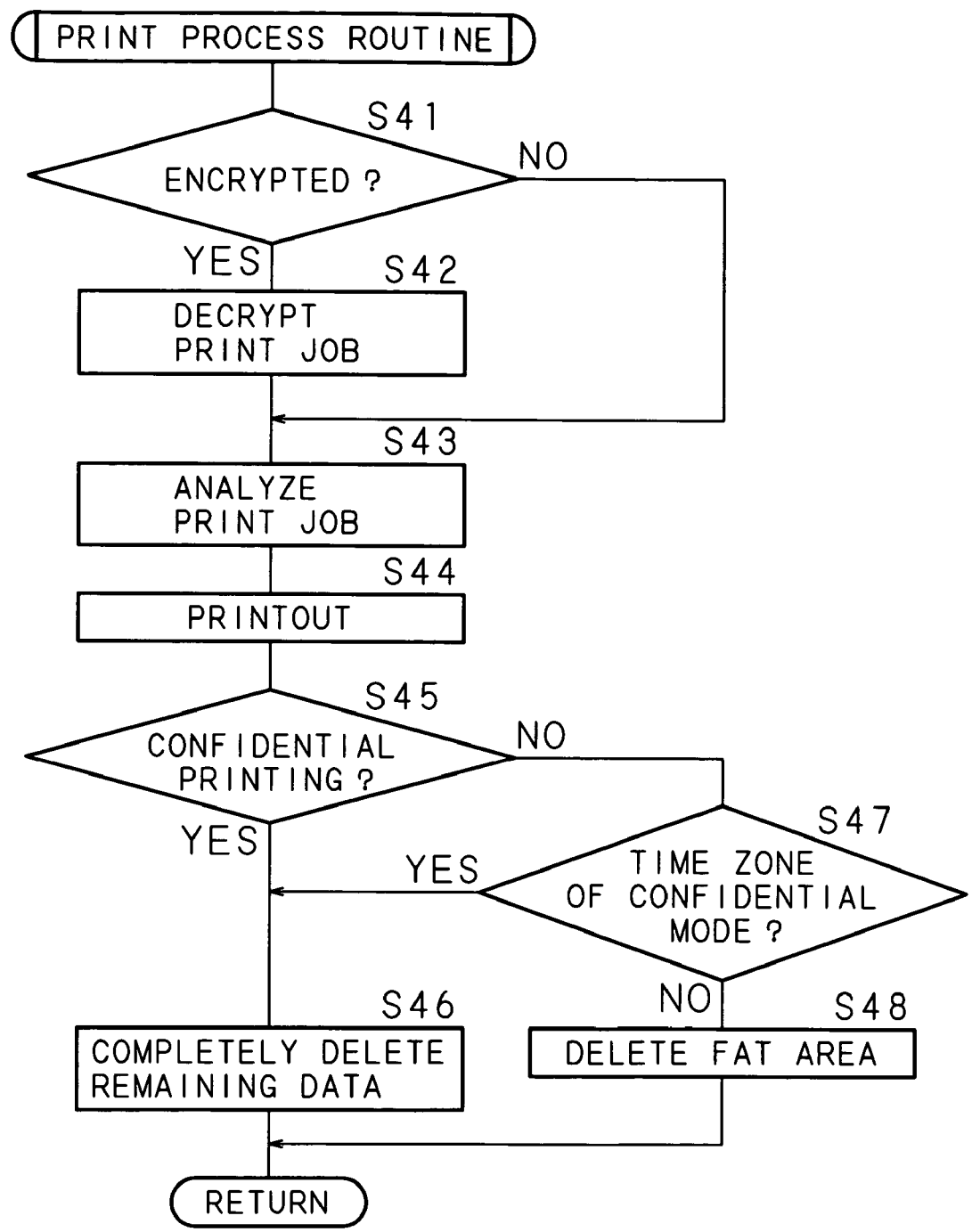
FIG. 11 is a flowchart for explaining illustrative non-limiting processing steps of a print process routine.

FIG. 11 is a flowchart for explaining the processing steps of an illustrative non-limiting example of a print process routine. When executing the print process in step S23 and step S32 of the flowchart shown in FIG. 9 and FIG. 10, first, the control unit 21 determines whether or not the corresponding print job has been encrypted (step S41). If a determination is made that the print job has been encrypted (S41: YES), the control unit 21 decrypts the print job (step S42). When decryption of the print job has been finished, or when a determination is made in step S41 that the print job has not been encrypted (S41: NO), the control unit 21 analyzes the print job stored in the job storage area 31a (step S43), and acquires information, such as the number of pages, an enlargement/reduction ratio and the orientation of the image, and develops image data on the RAM 24 from the print job. Then, the control unit 21 transfers the image data developed on the RAM 24 to the image forming unit 28, and prints and outputs the image on a sheet specified by the print job (step S44).

Next, the control unit 21 determines whether or not the print job specified confidential printing such as a secure process (step S45). If a determination is made that the print job specified confidential printing (S45: YES), the control unit 21 completely deletes the print job (remaining data) after the printing process (step S46). On the other hand, if a determination is made that the print job did not specify confidential printing (S45: NO), the control unit 21 determines, based on the schedule management table 31b and the date outputted by the clock unit 32, whether or not it is the time zone of confidential mode (step S47). If a determination is made that it is the time zone of confidential mode (S47: YES), the control unit 21 performs the process of step S46. If a determination is made that it is not the time zone of confidential mode (S47: NO), the control unit 21 executes the deletion of the FAT area (step S48).

Note that in this embodiment, when a print job is received by the image forming apparatus 20, the print job itself is stored in the HDD device 31 and kept on standby until an execution request is made, but it may be possible to perform a mode in which the received print job is analyzed and developed into image data for printing, and then the developed image data is stored in the HDD device 31 to wait for a job. At this time, the image forming apparatus 20 determines whether or not the received print job has been encrypted, and, if encrypted, the image forming apparatus 20 decrypts the print job and analyzes the print job to develop it into image data for printing. Further, the image forming apparatus 20 determines whether or not the time zone in which the print job was received is the time zone of confidential mode, and, if it is the time zone of confidential mode, the image forming apparatus 20 encrypts the image data developed in the same manner as above, stores it in the HDD device 31, and waits until an execution request for the print process is made.

Embodiment 2

In Embodiment 1, a non-completely deleted area is completely deleted while no print job is processed, but if the storage capacity of the HDD device 31 of the image forming apparatus 20 is large, or if print jobs are frequently received and processed, even when it is nearly the time to turn off the power such as the closing time, a non-completely deleted area may remain in the HDD device 31. Therefore, in order to enhance the confidentiality of data processed in the image forming apparatus 20, it is desired to completely delete all non-completely deleted areas at the closing hour. In this embodiment, a limit time is set in addition to the time zone of normal mode and the time zone of confidential mode, and complete deletion of the non-completely deleted areas stored so far is given top priority after the limit time. Note that since the entire structure of the image forming system and the internal structures of the information processor 10 and image forming apparatus 20 can be very similar to those in Embodiment 1, the explanation thereof will be omitted.

FIG. 12 is a conceptual view showing another non-limiting example of the schedule management table 31b (18b). In this embodiment, two modes are set for the security process, and further the above-mentioned limit time is set. In the example shown in FIG. 12, similarly to Embodiment 1, 9:00 to 15:00 on weekdays is set as the normal mode in which the received print job is executed prior to the security process, and 15:00 until power off on weekdays, and holidays are set as the confidential mode in which the security process is executed prior to the received print job. Further, 17:00 on weekdays is defined as the limit time.

FIG. 13 is a schematic view for explaining an illustrative non-limiting example process performed after the limit time. When the control unit 21 determines that it is the limit time based on the date information outputted by the clock unit 32 and the schedule management table 31b, the control unit 21 deletes the processed print job remaining in the job storage area 31a at this time without being deleted. At this time, the control unit 21 repeats overwriting of random data and deletion of data to make it difficult to reproduce the processed job, and, if the control unit 21 receives a new print job, it encrypts the print job and writes the encrypted print job over the processed print job.

Figure 14:
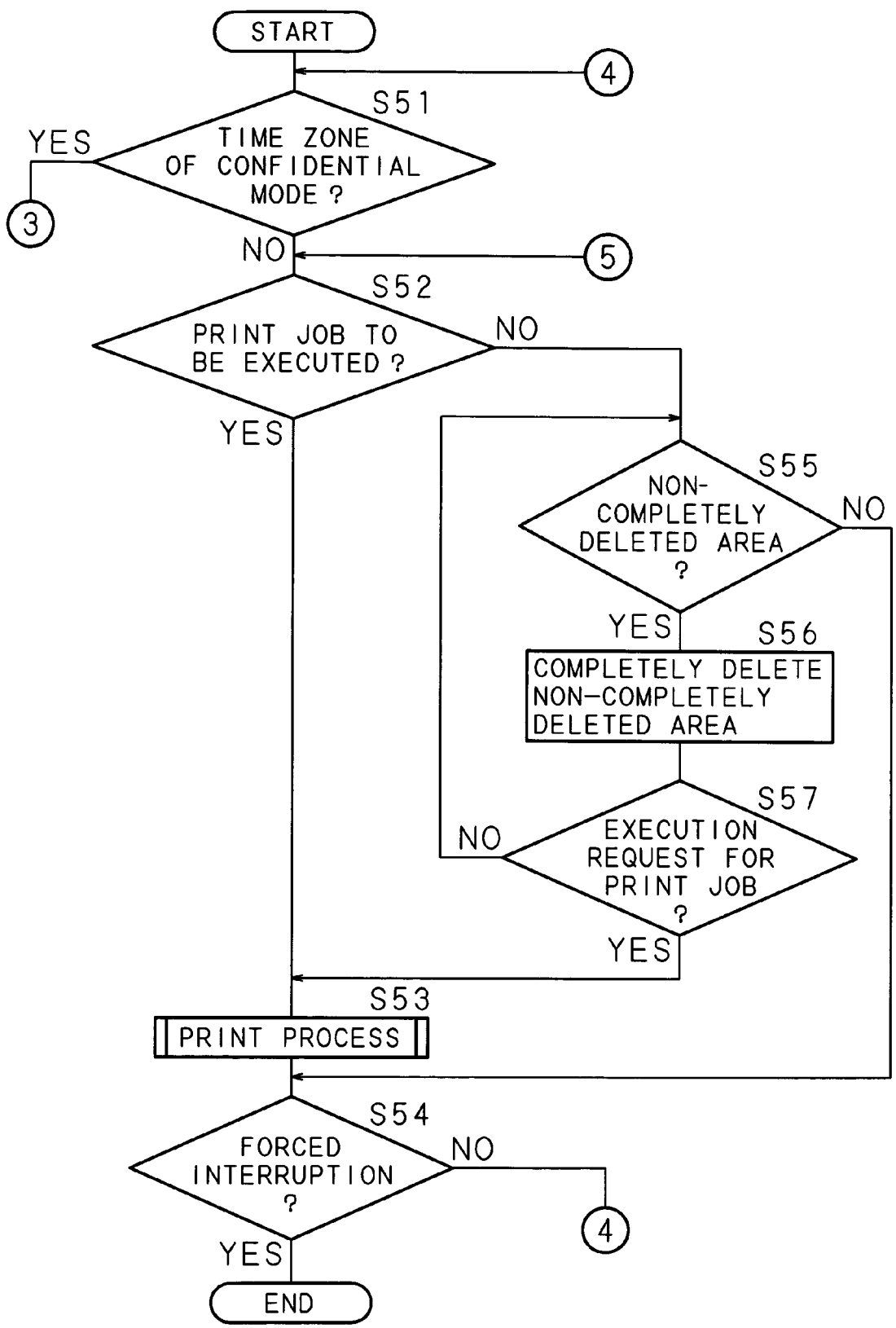
FIGS. 14 and 15 are a flowchart for explaining illustrative non-limiting processing steps of a security process to be executed by an image forming apparatus in each time zone.
Figure 15:
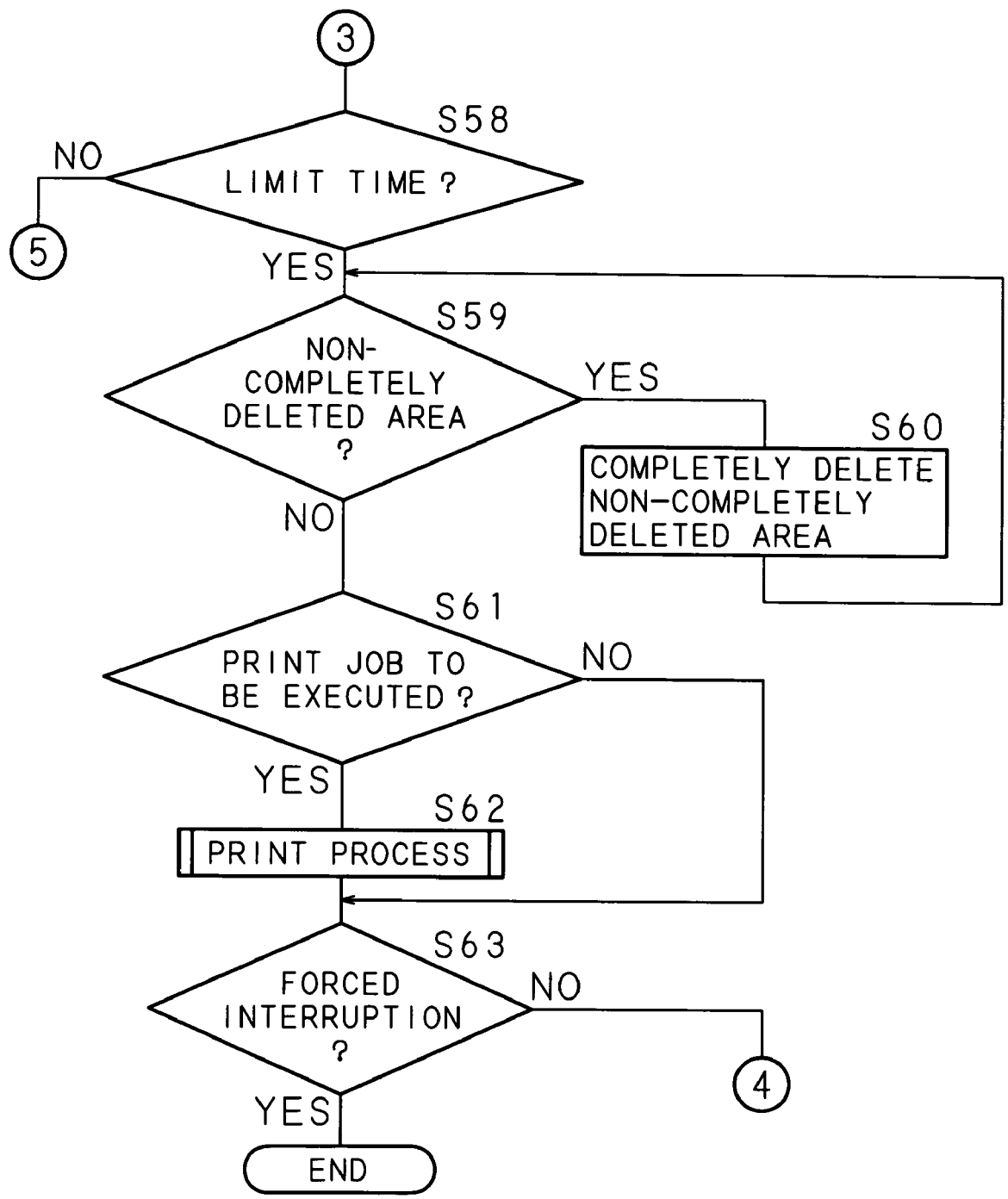

FIG. 14 and FIG. 15 show a flowchart for explaining illustrative non-limiting example of processing steps of a security process to be executed in each time zone by the image forming apparatus 20. First, the control unit 21 of the image forming apparatus 20 determines, based on the schedule management table 31b and the date information outputted by the clock unit 32, whether or not it is the time zone of confidential mode (step S51). If a determination is made that it is not the time zone of confidential mode (S51: NO), the control unit 21 refers to the print job management unit 29 and determines whether or not there is a print job to be executed (step S52). If there is a print job to be executed (S52: YES), the control unit 21 executes the print process based on the print job (step S53). Then, the control unit 21 determines whether or not there is a forced interruption caused by turning off the power of the image forming apparatus 20, resetting, etc. (step S54). If a determination is made that there is not a forced interruption (S54: NO), the control unit 21 returns the procedure to step S51, and, if a determination is made that there is a forced interruption (S54: YES), the control unit 21 finishes the procedure according to this flowchart.

In step S52, if the control unit 21 determines that there is no print job to be executed (S52: NO), it determines whether or not there is a non-completely deleted area stored in the job storage area 31a (step S55). If the control unit 21 determines that there is a non-completely deleted area (S55: YES), it completely deletes the non-completely deleted area (step S56). Next, the control unit 21 determines whether or not there is an execution request for the print process by a newly received print job (step S57). If a determination is made that there is an execution request (S57: YES), the control unit 21 moves the procedure to step S53 and executes the print process. On the other hand, if a determination is made that there is not an execution request (S57: NO), the control unit 21 returns the procedure to step S55, and continues to completely delete the non-completely deleted area remaining in the job storage area 31a of the HDD device 31. In step S55, if a determination is made that there is not a non-completely deleted area (S55: NO), the control unit 21 moves the procedure to step S54. Thus, in the time zone of normal mode, when a print job to be executed is received, execution of the process of the print job is given top priority, and the non-completely deleted area stored in the job storage area 31a of the HDD device 31 is deleted while no print job is received.

In step S51, if a determination is made that it is the time zone of confidential mode (S51: YES), the control unit 21 determines whether or not it is the limit time (step S58). If a determination is made that it is the time zone of confidential mode but not the limit time (S58: NO), the control unit 21 returns the procedure to step S52. However, when there is a print job to be executed in the confidential mode and the print process has been performed in step S53, the control unit 21 completely deletes the print job from the job storage area 31a after completing the print job.

In step S58, if a determination is made that it is the limit time (S58: YES), the control unit 21 determines whether or not there is a non-completely deleted area stored in the job storage area 31a (step S59). If a determination is made that there is a non-completely deleted area (S59: YES), the control unit 21 completely deletes the non-completely deleted area (step S60), and returns the procedure to step S59. If a new print job is received when completely deleting the non-completely deleted area, the control unit 21 encrypts the print job, stores the encrypted print job by writing it over the non-completely deleted area, and waits until the turn to execute the print job.

In step S59, if a determination is made that there is not a non-completely deleted area (S59: NO), the control unit 21 determines whether or not there is a print job to be executed (step S61). If a determination is made that there is a print job to be executed (S61: YES), the control unit 21 executes the print process (step S62). When the print process has been finished, or if a determination is made that there is no print job to be executed (S61: NO), the control unit 21 determines whether or not there is a forced interruption caused by turning off the power of the image forming apparatus 20, resetting, etc. (step S63). If a determination is made that there is not a forced interruption (S63: NO), the control unit 21 returns the procedure to step S51, and if a determination is made that there is a forced interruption (S63: YES), the control unit 21 finishes the procedure according to this flowchart.

Thus, in this embodiment, when it comes to the limit time, deletion of all the processed non-completely deleted areas is given top priority, and then, if there is a print job, the print process is executed. Hence, since the possibility that a non-completely deleted area may remain in the HDD device 31 when the power of the image forming apparatus 20 is turned off is low, it is possible to maintain the confidentiality of data. Although this embodiment illustrates a mode in which when the image forming apparatus 20 receives a print job, the print job is stored in the HDD device 31 and kept on standby until an execution request is made, it may also be possible to perform a mode in which the received print job is analyzed and developed into image data for printing, and then the developed image data is stored in the HDD device 31 to wait for a job.

The invention claimed is:

1. An image forming system, comprising:
    an information processor including
        a receiving unit for receiving data concerning image formation, and
        a transmitting unit for transmitting the data; and
    an image forming apparatus including
        a receiving unit for receiving the data transmitted from said information processor,
        a storage unit for storing the data,
        an image forming unit for forming an image on a sheet based on the data stored in said storage unit, the data for which the corresponding image has been formed is defined as processed data and the data for which the corresponding image has not yet been formed is defined as unprocessed data,
        a clock unit for outputting time information;
        a determination unit for determining, based on the time information outputted by said clock unit, whether or not it is a predetermined time zone, and
        a processing unit for performing a predetermined process on the processed data,
        wherein when the determination unit determines that it is the predetermined time zone and there are both processed data and unprocessed data in the storage unit, the processing unit performs the predetermined process on the processed data prior to the image forming unit forming the corresponding image based on the unprocessed data, and
        wherein when the determination unit determines that it is not the predetermined time zone and there are both processed data and unprocessed data in the storage unit, the image forming unit forms the corresponding image based on the unprocessed data prior to the processing unit performing the predetermined process on the processed data.

2. The image forming system of claim 1, wherein the predetermined process is a process of deleting the processed data from the storage unit.

3. The image forming system as set forth in claim 1, wherein said information processor comprises an encrypting unit for encrypting the data received in the predetermined time zone, and for transmitting the encrypted data to said image forming apparatus.

4. The image forming system of claim 3, wherein the predetermined process is a process of deleting the processed data from the storage unit.

5. The image forming system of claim 1,
    wherein when the determination unit determines that it is the predetermined time zone, the processing unit performs the predetermined process on the processed data corresponding to all images that have been formed and then the image forming unit forms the corresponding image based on the unprocessed data, and
    wherein when the determination unit determines that it is not the predetermined time zone, the image forming unit forms the corresponding image based on the unprocessed data corresponding to all images that have not yet been formed and then the processing unit performs the predetermined process the processed data.

6. An image forming apparatus, comprising:
    a receiving unit for receiving data concerning image formation;
    a storage unit for storing the received data;

an image forming unit for forming an image on a sheet based on the data stored in said storage unit, the data for which the corresponding image has been formed is defined as processed data and the data for which the corresponding image has not yet been formed is defined as unprocessed data, a clock unit for outputting time information;

a first determination unit for determining, based on the time information outputted by said clock unit, whether or not it is a predetermined time zone; and a processing unit for performing a predetermined process on the processed data, wherein when the first determination unit determines that it is the predetermined time zone and there are both processed data and unprocessed data in the storage unit, the processing unit performs the predetermined process on the processed data prior to the image forming unit forming the corresponding image based on the unprocessed data, and wherein when the first determination unit determines that it is not the predetermined time zone and there are both processed data and unprocessed data in the storage unit, the image forming unit forms the corresponding image based on the unprocessed data prior to the processing unit performing the predetermined process on the processed data.

7. The image forming apparatus of claim 6, wherein the predetermined process is a process of deleting the processed data from the storage unit.

8. The image forming apparatus of claim 6, wherein
the received data includes information concerning whether or not the received data itself is confidential, and
said image forming apparatus further comprises:
a second determination unit for determining whether or not the received data is confidential;
an encrypting unit for encrypting the received data when a determination is made that the received data is confidential; and
a storage control unit for storing the encrypted received data in said storage unit.

9. The image forming apparatus of claim 8, further comprising a deleting unit for deleting a data area related to the processed data that has not been deleted from said storage unit when said first determination unit determines that it is the predetermined time zone.

10. The image forming apparatus of claim 9, further comprising a third determination unit for determining whether or not there is unprocessed data,
wherein when there is no unprocessed data, the data area related to the processed data that has not been deleted in said storage unit is deleted.

11. The image forming apparatus of claim 10, further comprising a fourth determination unit for determining whether or not the time information outputted by said clock unit is a predetermined time,
wherein a data area related to the processed data that has not been deleted in said storage unit is deleted upon determining that it is the predetermined time.

12. The image forming apparatus of claim 10, wherein when storing the encrypted and/or unencrypted received data in said storage unit, the received data is written over a data area related to the processed data that has not been deleted from said storage unit.

13. The image forming apparatus of claim 8, further comprising a fourth determination unit for determining whether or not the time information outputted by said clock unit is a predetermined time,
wherein a data area related to the processed data that has not been deleted in said storage unit is deleted upon determining that it is the predetermined time.

14. The image forming apparatus of claim 8, wherein when storing the encrypted and/or unencrypted received data in said storage unit, the received data is written over a data area related to the processed data that has not been deleted from said storage unit.

15. The image forming apparatus of claim 9, further comprising a fourth determination unit for determining whether or not the time information outputted by said clock unit is a predetermined time,
wherein a data area related to the processed data that has not been deleted in said storage unit is deleted upon determining that it is the predetermined time.

16. The image forming apparatus of claim 9, wherein when storing the encrypted and/or unencrypted received data in said storage unit, the received data is written over a data area related to the processed data that has not been deleted from said storage unit.

17. The image forming apparatus of claim 6,
wherein when the first determination unit determines that it is the predetermined time zone, the processing unit performs the predetermined process on the processed data corresponding to all images that have been formed and then the image forming unit forms the corresponding image based on the unprocessed data, and
wherein when the determination unit determines that it is not the predetermined time zone, the image forming unit forms the corresponding image based on the unprocessed data corresponding to all images that have not yet been formed and then the processing unit performs the predetermined process the processed data.

18. An image forming apparatus, comprising:
a communication unit arranged to receive one or more print jobs from one or more information processors;
a storage device arranged to store the one or more print jobs received by the communication unit; and
a control unit arranged to perform a print process on one or more unprocessed print jobs stored in the storage device and to perform a security process on one or more processed print jobs in the storage device, wherein
an operation mode of the image forming apparatus is one of at least a normal mode and a confidential mode, and
when there are both processed print job(s) and unprocessed print job(s) in the storage device, the control unit is arranged to:
prioritize performing the print process on the unprocessed print job(s) over performing the security process on the processed print job(s) when the operation mode is the normal mode, and
prioritize performing the security process on the processed print job(s) over performing the print process on the unprocessed print job(s) when the operation mode is the confidential mode.

19. The image forming apparatus of claim 18, wherein the control unit is arranged to determine the operation mode based on a current time.

20. The image forming apparatus of claim 18, wherein the security process comprises completely deleting a processed print job from the storage device, completely deleting the processed print job being defined as deleting both the processed print job and a location information of the processed print job.

21. The image forming apparatus of claim 20, wherein the control unit is arranged to perform the security process on all processed print jobs prior to performing the print process on any unprocessed print jobs when the operation mode is the confidential mode.

22. The image forming apparatus of claim 20, wherein the control unit is arranged to:
   determine whether or not there are any unprocessed print jobs left in the storage device when the operation mode is the normal mode, and
   perform the security process on one or more processed print jobs until an execution request to perform the print process is received when it is determined that there are no unprocessed print jobs left in the storage device when the operation mode is the normal mode.

23. The image forming apparatus of claim 18, wherein the control unit is arranged perform the print process on a print job, the print process comprising:
   printing out the print job;
   after printing out the print job, completely deleting the print job from the storage device when the operation mode is the confidential mode or when the print job is a confidential print job, completely deleting the print job being defined as deleting both the print job and a location information of the print job; and
   after printing out the print job, deleting the location information of the print job from the storage device when the operation mode is the normal mode and the print job is not the confidential print job.

24. The image forming apparatus of claim 18, wherein the control unit is arranged to overwrite an already processed print job in the storage device with a newly received print job when the operating mode is the normal mode.

25. The image forming apparatus of claim 18, wherein the control unit is arranged to encrypt a newly received print job and to store the encrypted print job in the storage device when the operation mode is the confidential mode or when the newly received print job is a confidential print job.

26. The image forming apparatus of claim 18, wherein the control unit is arranged to prioritize performing the security process on the processed print job(s) over performing the print process on the unprocessed print job(s) when the operation mode is the confidential mode and a limit set time is reached.

27. The image forming apparatus of claim 26, wherein the control unit is arranged to encrypt a newly received print job and to store the encrypted print job in the storage device when the limit set is reached.

28. The image forming apparatus of claim 27, wherein the control unit is arranged to store the encrypted print job by overwriting an already processed print job in the storage device.

29. The image forming apparatus of claim 18, wherein the control unit is arranged to:
   perform the security process on all processed print jobs prior to performing the print process on any unprocessed print jobs when the operation mode is the confidential mode, and
   perform the print process on all unprocessed print jobs prior to performing the security process on any processed print jobs when the operation mode is the normal mode.

* * * * *